United States Patent [19]

Rutström

[11] Patent Number: 5,071,279
[45] Date of Patent: Dec. 10, 1991

[54] PIVOTAL ATTACHMENT MEANS

[75] Inventor: Heléne M. Rutström, Åkersberga, Sweden

[73] Assignee: Telefonaktiebolaget L M Ericsson, Stockholm, Sweden

[21] Appl. No.: 654,017

[22] Filed: Feb. 12, 1991

[30] Foreign Application Priority Data

Feb. 13, 1990 [SE] Sweden .............................. 9000517

[51] Int. Cl.$^5$ .............................................. F16C 11/06
[52] U.S. Cl. ...................................... 403/90; 403/84; 403/114
[58] Field of Search .................... 403/90, 115, 76, 114, 403/84

[56] References Cited

U.S. PATENT DOCUMENTS

| | | | |
|---|---|---|---|
| 1,934,223 | 11/1933 | Booth | 403/90 X |
| 2,861,501 | 11/1958 | Strelakos | 403/90 X |
| 4,941,481 | 7/1990 | Wakenknecht | 403/90 X |

Primary Examiner—Andrew V. Kundrat
Attorney, Agent, or Firm—Burns, Doane, Swecker & Mathis

[57] ABSTRACT

The present invention relates to a pivotal attachment means intended for attaching an object to a supporting surface and comprising a lower attachment part (1) which is intended to be fastened to the supporting surface and which includes an outwardly projecting part (9) configured with a central dished recess (10) and a surrounding screw thread (11), and an upper attachment part (3) including an attachment plate (4) which is intended to be fastened to the object, a spacer bolt (5) which projects out from the attachment plate, an attachment nut (6) which is placed around the spacer bolt and which is firmly screwed to the outwardly projecting part of the lower attachment part and is provided with an inwardly projecting edge (16) having a dished chamfer or bevel (17), and a spherical body (7) which is attached to the outer end of the spacer bolt and which is positioned in the space between the lower attachment part and the attachment nut. According to the invention, the dished recess (10) of the lower attachment part (1) is configured with wedge-shaped projections (12) against which the spherical body (7) lies, and the spherical body is manufactured from a material which is softer than the material from which the lower attachment part and the attachment nut are made.

3 Claims, 2 Drawing Sheets

PIVOTAL ATTACHMENT MEANS

TECHNICAL FIELD

The present invention relates to a pivotal attachment means for attaching an object to a supporting surface, said attachment means comprising a lower part which is intended to be fastened to the supporting surface and which includes an outwardly projecting part having a central, dished recess and a surrounding screw thread, and an upper part which includes an attachment plate intended to be fastened to the object, a spacer bolt which projects out from the attachment plate, an attachment nut which is placed around the spacer bolt and which is screwed firmly to the outwardly projecting part on the lower part of said pivotal attachment and provided with an inwardly projecting edge having a dish-shaped chamfer, and further comprising a spherical body which is attached to the outer end of the spacer bolt and which is located in the space between the lower part of said attachment and the attachment nut.

BACKGROUND ART

It is known to use so-called pivotal attachments of this kind for the purpose of attaching an object to a supporting surface while enabling the object to be moved to different positional settings and angular positions in relation to the supporting surface. The known attachments, however, are encumbered with certain drawbacks. For instance, it is necessary with these attachments to screw down the nut very tightly in order to achieve a stable attachment, i.e. in order to ensure that the object will not move out of its set position. Another drawback is the risk that these known attachments will fasten in one set position from which the attachment cannot be moved, due to the fact that the spherical body has become clamped or pinched in the lower part of the attachment assembly, partly as a result of the large tightening force applied to the nut and partly because of the unsuitable configuration of the dished recess.

DISCLOSURE OF THE INVENTION

The object of the present invention is to overcome the drawbacks associated with known pivotal attachment means and to provide a pivotal attachment means which can be readily adjusted to different angular positions and setting positions and with which the risk of the spherical body being clamped firmly in the recess is minimized. This is achieved by providing the dished recess of the lower part of the attachment means with wedge-shaped projections against which the spherical body rests, and by manufacturing the spherical body from an inelastic material which is softer than the material from which said lower attachment part and said nut are made.

The spherical body is preferably manufactured from a polyester elastomer.

The attachment nut is advantageously provided with radially projecting arms which function as a handgrip.

The inventive pivotal attachment means provides several advantages. One advantage is that the nut need not be tightened with unreasonable force while nevertheless providing a sufficiently stable attachment without disturbing the setting of the object. Because the spherical body is made of a softer material than the nut and the lower attachment part, the wedge-shaped projections will enter the spherical body and lock the same. Another advantage is that there is no risk of the spherical body wedging in the recess, therewith enabling the set position of the object to be readily changed.

The advantage afforded by manufacturing the spherical body from a polyester elastomer is that this material is sufficiently soft to enable the spherical body to be affixed over the wedges and is, at the same time, so hard that the spherical body need not be elastic, which affords stable attachment of the object in the absence of swinging.

Because the nut is provided with outwardly projecting arms which function as a handgrip, the nut can be readily tightened by hand, without requiring tools herefor.

The invention will now be described in more detail with reference to an exemplifying embodiment thereof and also with reference to the accompanying drawing.

BEST MODE FOR CARRYING OUT THE INVENTION

Figure 1:
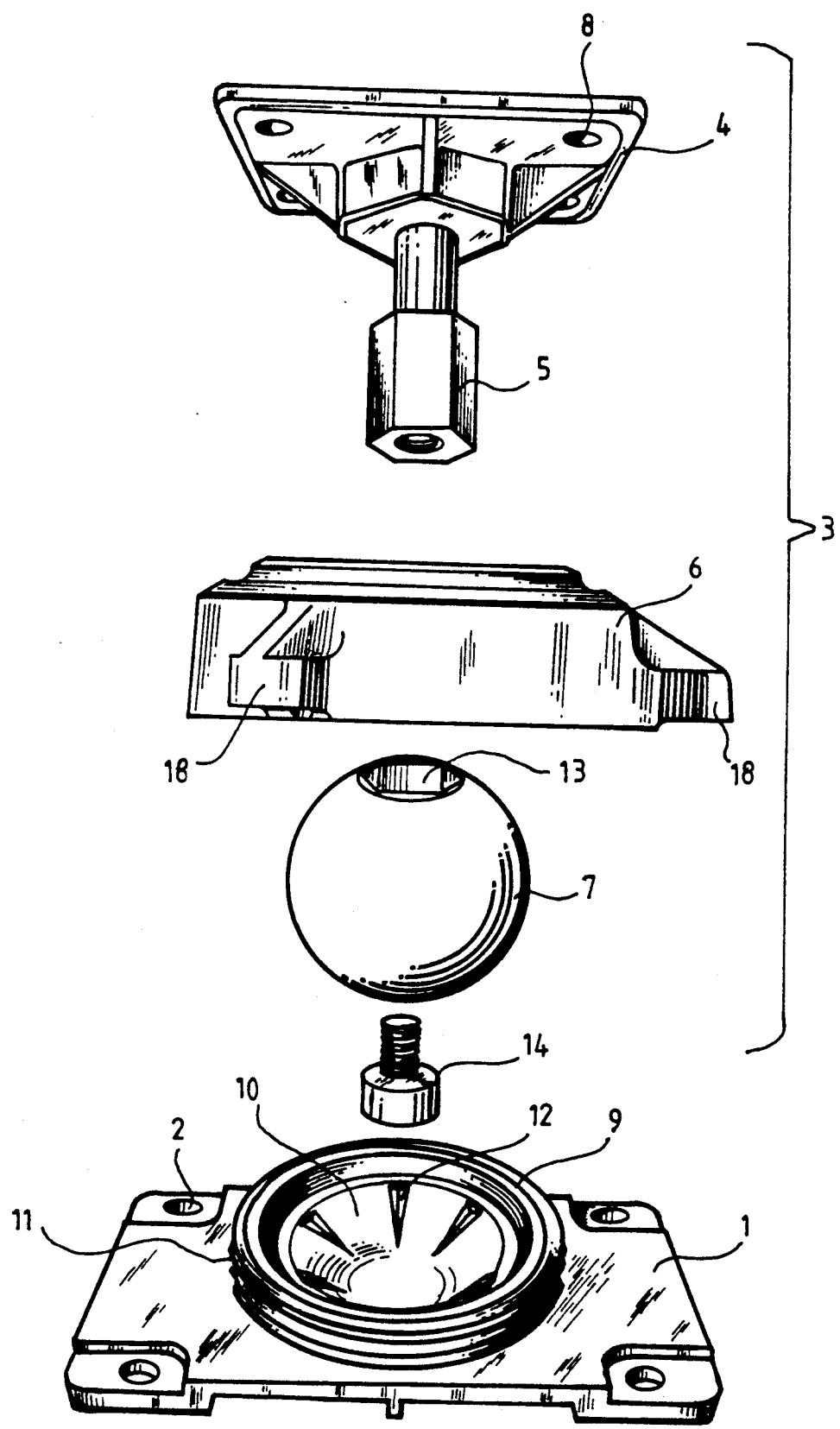
FIG. 1 is a perspective, exploded view of the components of a pivotal attachment means according to the invention.

FIG. 1 is a perspective view of the components of an inventive pivotal attachment means. The attachment comprises a lower part 1 which is intended to be secured to a supporting surface, for instance by means of screws which pass through screw holes 2, and an upper part 3 which includes an attachment plate 4, a spacer bolt 5, an attachment nut 6 and a spherical body 7. The attachment plate 4 is intended to be secured to an object in some suitable manner, for instance with the aid of screws passing through screw holes 8.

The lower part includes an outwardly projecting or upstanding part which is configured with a central dished recess 10. The outer surface of the projecting part 9 has formed thereon an external screw thread 11 for engagement with a corresponding screw thread on the nut 6. The radius of the recess 10 is somewhat larger than the radius of the spherical body 7 and is provided with vertically extending wedge-shaped projections 12, which lie against the spherical body. As is evident from FIGS. 1 and 2, the projections 12 are elongated and converge toward a longitudinal axis L of the screw threads in a direction away from the bevel 17.

The spacer bolt 5 is moulded in the attachment plate 4 so that it cannot be twisted relative to the plate, or is attached to said plate in some other suitable manner. The outer end of the spacer bolt has an hexagonal configuration, or some other non-circular configuration, and is attached in the spherical body 7 in a corresponding cavity 13 therein, with the aid of a screw 14 accommodated in a recessed hole 15 in the spherical body, as clearly shown in FIG. 2. The nut 6 is passed over the bolt 5, prior to securing the spherical body 7 on said bolt. The nut 6 is provided with an edge 16 which projects out over the spherical body and which is provided with a dish-shaped chamfer or bevel 17 which lies against the spherical body and holds said body firm. The nut is also provided with radially and outwardly projecting arms 18 which function as a handgrip when tightening and loosening the nut.

Figure 2:
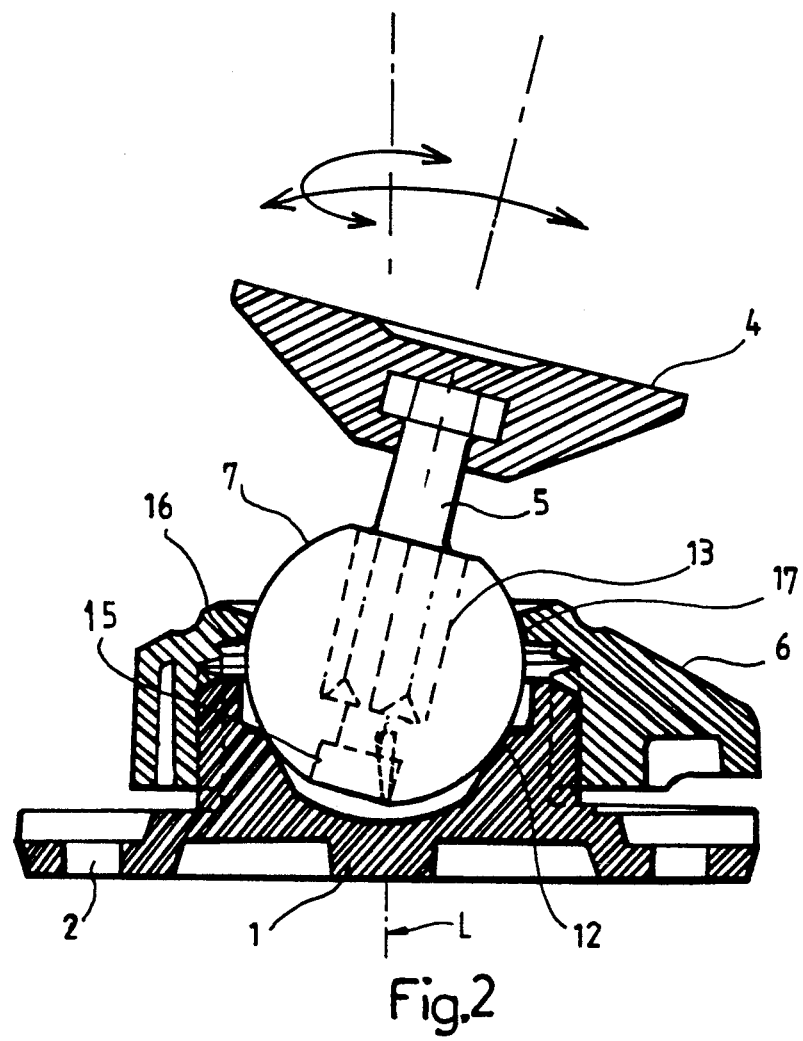
FIG. 2 is a sectional view of the pivotal attachment shown in FIG. 1 when assembled.

When the nut 6 is tightened against the lower part 1, the edge 16 presses the spherical body 7 into abutment with the projections 12 in the recess 9 of the lower attachment part, therewith causing the projections to penetrate into the spherical body and positively lock said body in an adjusted position, as illustrated in FIG. 2. The wedge-shaped projections also function to ensure that the spherical body will not fasten in the lower attachment part, therewith enabling the pivotal attachment to be readily loosened in order to change the setting of said object. In order to achieve positive settings, the spherical body 7 is configured from a material which is softer than the material from which the lower attachment part 1 and the attachment nut 6 are made, for instance, of a polyester elastomer, which is sufficiently soft to permit the projections to penetrate into the spherical body but, at the same time, sufficiently rigid to ensure that the pivotal attachment will not swing when load is applied. The lower attachment part and the attachment nut are preferably made of a polyamide material, which is sufficiently hard to provide satisfactory strength to the pivotal attachment.

It will be understood that the invention is not restricted to the aforedescribed and illustrated embodiment and that modifications can be made within the scope of the accompanying claims.

I claim:

1. A pivotal assembly for attaching an object to a supporting surface, comprising:

a first attachment part intended for attachment to said supporting surface and including an outwardly projecting part having a central dished recess and a surrounding first screw thread defining a longitudinal axis;

a second attachment part including an attachment plate adapted to be fastened to the object;

a spacer bolt projecting from the attachment plate;

a nut disposed around the spacer bolt and including a second screw thread screwed firmly to the first screw thread, said nut including an inwardly facing beveled edge;

a spherical body attached to the outer end of the spacer bolt and positioned in a space between the first attachment part and the nut, the spherical body being pushed toward the first attachment part by the beveled edge; and a plurality of circumferentially spaced, wedge-spaced projections projecting into the recess from a surface of the recess, the projections being elongated and converging toward the longitudinal axis in a direction away from the beveled edge, the spherical body bearing against the projections.

2. A pivotal attachment according to claim 1, characterized in that the spherical body is made from a polyester elastomer.

3. A pivotal attachment according to claim 1, characterized in that the nut is provided with radially and outwardly projecting arms which define a handgrip.

* * * * *